US006658603B1

(12) United States Patent
Ward

(10) Patent No.: US 6,658,603 B1
(45) Date of Patent: Dec. 2, 2003

(54) METHOD AND APPARATUS FOR EFFICIENTLY GENERATING AND IMPLEMENTING ENGINE ERROR CODES AND VERIFYING THE CORRECTNESS OF THE IMPLEMENTATION OF THE ENGINE ERROR CODES

(75) Inventor: David Ward, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/551,023

(22) Filed: Apr. 17, 2000

(51) Int. Cl.[7] .............................................. G06F 11/00
(52) U.S. Cl. ................................. 714/52; 714/33
(58) Field of Search ........................ 714/52, 5, 44, 714/47, 33

(56) References Cited

U.S. PATENT DOCUMENTS

| 4,205,370 | A |   | 5/1980  | Hirtle ........................... 714/45  |
|-----------|---|---|---------|-------------------------------------------|
| 4,545,013 | A | * | 10/1985 | Lyon et al. .................. 714/712    |
| 5,519,858 | A |   | 5/1996  | Walton et al. ................ 707/10     |
| 5,581,696 | A |   | 12/1996 | Kolawa et al. ............... 714/38      |
| 5,787,275 | A |   | 7/1998  | Li ............................... 707/103 |
| 5,862,316 | A |   | 1/1999  | Hagersten et al. ............ 714/15      |
| 5,892,941 | A |   | 4/1999  | Khan et al. .................... 703/22   |
| 5,928,369 | A | * | 7/1999  | Keyser et al. ................. 714/47    |
| 5,983,364 | A | * | 11/1999 | Bortcosh et al. ............... 714/25    |
| 6,192,491 | B1 | * | 2/2001  | Cashman et al. .............. 714/52     |
| 6,279,122 | B1 | * | 8/2001  | Hitchcock et al. ............ 714/33     |
| 6,477,667 | B1 | * | 11/2002 | Levi et al. .................... 714/57  |
| 6,519,048 | B1 | * | 2/2003  | Tanaka ....................... 358/1.13   |

FOREIGN PATENT DOCUMENTS

JP          10-228365       *   8/1998

* cited by examiner

*Primary Examiner*—Scott Baderman
*Assistant Examiner*—Anne L. Damiano

(57) ABSTRACT

A method and apparatus for efficiently generating engine error codes is disclosed. An error processing system according to the present invention includes an error table describing error states for use in generating error codes based upon the an error even, an engine for providing an error event and an error processor, coupled to the engine and the error table, the error processor including a general run time error generator for generating a list of errors according to the error table. Accordingly, modifications may be made to the error table for changes to the product error specification and for new products that do not necessitate a re-coding of the error processing system.

28 Claims, 3 Drawing Sheets

METHOD AND APPARATUS FOR EFFICIENTLY GENERATING AND IMPLEMENTING ENGINE ERROR CODES AND VERIFYING THE CORRECTNESS OF THE IMPLEMENTATION OF THE ENGINE ERROR CODES

BACKGROUND OF THE INVENTION

1. Field of the Invention

This invention relates in general to the recovery from a software or hardware error in a data processing system, and more particularly to a method and apparatus for efficiently generating and implementing engine error codes and verifying the correctness of the implementation of the engine error codes.

2. Description of Related Art

Data output devices used in conjunction with host computing systems, such as printers and plotters, use a complex series of interactions between the software services and objects and the hardware functions to provide the printed or otherwise processed end-product. In such a system, a document or series of documents comprising at least one print job are successively processed, resulting in image signals which electronically stored. The signals are later transferred to a printer for formation of the images on paper. Such a document can be printed any number of times or processed in any number of ways (e.g., words deleted or added; image magnified or reduced, etc.).

In such a system, the occurrence of faults on all levels of functioning can occur. Software object faults may occur to result in such faults as illegal job parameters, corrupted data, resource problems, input master errors, font problems, etc. Mechanisms for dealing with such faults are an integral and necessary component of the system, because such faults will result in the interruption of the system, and possibly a crash of the system which requires that the system be rebooted. Information from the system provided to the operator directing the operator to the fault or faults causing the job interruption is critical to the efficient operation of the system.

When an error is discovered in a data processing system, such as a printer or plotter, a specific recovery action, or series of actions, may be generated to restore the system to working order. These actions include restarting a software process, reinitializing a data area, rebooting a central processing unit, resetting a piece of hardware, etc. In a complicated system, it is often difficult to determine in real time which basic hardware or software components of the system are at fault and require the attention of recovery actions. Because the availability of the entire data processing system is dependent upon a rapid reacquisition of full working status, an efficient strategy is required to minimize system recovery time.

One known method for recovery from a detected error is to examine all known system variables to precisely determine the state of the data processing system. The actual system state is then compared to all possible system states for which a sequence of recovery actions is known. The possible system states are referred to as "error states" and are retained in system memory, usually in the form of an error table. If the actual system state matches an error state, the sequence of recovery actions associated with such error state is invoked.

The detailed logic necessary to implement an error recovery subsystem is complex and often requires a significant development effort. The large number of system variables in a data processing system results in an immense number of system states which must be detectable, and in an immense number of error states which must be retained in memory. Moreover, although new error conditions are frequently identified during the life of the data processing system, additions and modifications to the logic of an error recovery subsystem are very difficult and expensive. For example, the logic used to program the system must be redesigned to retain and utilize new error states and their associated sequences of recovery actions as they are discovered. In addition, redesign is necessary as the appropriate sequence of recovery actions for a given error state changes due to aging of the data processing system components. The design and maintenance of error recovery subsystems thus tend to be costly and unresponsive to the experience gained during the life of a data processing system. Nevertheless, engines in a data processing system product line may be implemented with similar structures. Yet, each product has its own method for processing error codes. Moreover, theses unique processes are hard-coded for each device. Thus, each time the product error specification is changed, the error table is modified and the error processing system has to be re-coded.

It can be seen then that there is a need for a method and apparatus for efficiently generating and implementing engine error codes and verifying the correctness of the implementation of the engine error codes.

SUMMARY OF THE INVENTION

To overcome the limitations in the prior art described above, and to overcome other limitations that will become apparent upon reading and understanding the present specification, the present invention discloses a method and apparatus for efficiently generating and implementing engine error codes and verifying the correctness of the implementation of the engine error codes.

The present invention solves the above-described problems by implementing a general run time error processing method that may be common to engines in a range of products. This allows modifications to be made to the error table for changes to the product error specification and for new products without necessitating a re-coding of the error processing system.

A method in accordance with the principles of the present invention includes providing an error table specifically tailored for a first engine and generating a list of errors according to the error table using a general run time generator.

Other embodiments of a method in accordance with the principles of the invention may include alternative or optional additional aspects. One such aspect of the present invention is that the error table is generated according to a product error specification.

Another aspect of the present invention is that the method further includes updating the product error specification and updating the error table to match the product error specification.

Another aspect of the present invention is that the method further includes receiving an error code from a first engine, generating engine errors based upon a structure provided by the error table, processing the generated engine errors using error masking, transforming the errors and returning a list of errors.

Another aspect of the present invention is that the method further includes, prior to processing the generated engine errors using error masking, determining whether the generated engine errors comprise special error instructions and processing the special instructions when the generated engine errors comprise special error instructions.

Another aspect of the present invention is that the processing the generated engine errors using error masking further comprises setting an error mask.

Another aspect of the present invention is that the processing the generated engine errors using error masking further comprises clearing an error mask.

Another aspect of the present invention is that the generating engine errors based upon a structure provided by the error table comprises using a breadth first search.

Another aspect of the present invention is that the generating engine errors based upon a structure provided by the error table comprises using a depth first search.

Another aspect of the present invention is that the generating engine errors based upon a structure provided by the error table comprises using a combination of breadth and depth searching.

Another embodiment of the present invention includes a system for processing errors, wherein the system includes an error table describing error states for use in generating error codes based upon the an error event, an engine for providing an error event and an error processor, coupled to the engine and the error table, the error processor including a general run time error generator for generating a list of errors according to the error table.

Another aspect of the present invention is that the error table is generated according to a product error specification.

Another aspect of the present invention is that the error processor receives an error code from a first engine, generates engine errors based upon a structure provided by the error table, processes the generated engine errors using error masking, transforms the errors and returns a list of errors.

Another aspect of the present invention is that the error processor, prior to processing the generated engine errors using error masking, determines whether the generated engine errors comprise special error instructions and processes the special instructions when the generated engine errors comprise special error instructions.

Another aspect of the present invention is that the error processor processes the generated engine errors using error masking further comprises setting an error mask.

Another aspect of the present invention is that the error processor processes the generated engine errors using error masking further comprises clearing an error mask.

Another aspect of the present invention is that the error processor generates engine errors based upon a structure provided by the error table using a breadth first search.

Another aspect of the present invention is that the error processor generates engine errors based upon a structure provided by the error table comprises using a depth first search.

Another aspect of the present invention is that the error processor generates engine errors based upon a structure provided by the error table comprises using a combination of breadth and depth searching.

In another embodiment of the present invention, the error processing system may be implemented in a printer, wherein the printer includes a channel for receiving a data stream from a physical connection running a transport protocol stack, an interpretor, coupled to the channel, for converting a description of intended print instances in the data stream into images that are to be marked on print media, an input, output and a marker, the input providing the media to a marker for producing marks on the print media according to the images, the marker providing the printed media to the output and a system controller for implementing control functions for processing the images from the interpreter to the marker.

In another embodiment of the present invention, the method for processing error events may be implemented on an article of manufacture, wherein the article of manufacture includes a program storage medium readable by a computer, the medium tangibly embodying one or more programs of instructions executable by the computer to perform the method for efficiently generating and implementing engine error codes and verifying the correctness of the implementation of the engine error codes.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an efficient method for generating and implementing engine error codes and verifying the correctness of the implementation of the engine error codes. Accordingly, modifications may be made to the error table for changes to the product error specification and for new products that do not necessitate a re-coding of the error processing system.

Figure 1:
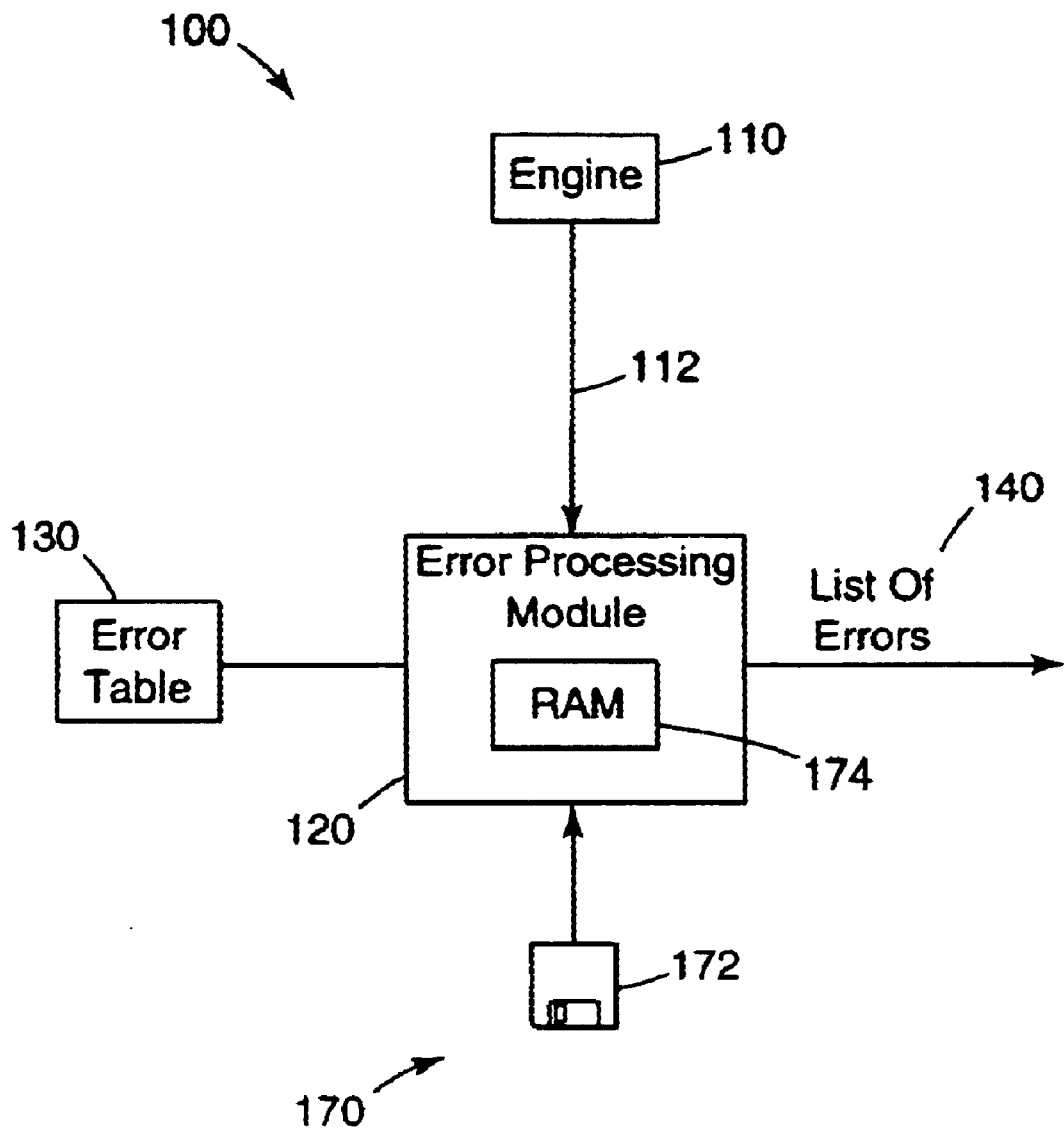
FIG. 1 illustrates a system for processing error events in a data output system.

FIG. 1 illustrates a system 100 for processing error events in a data output system. In FIG. 1, an engine 110, such as a print engine, detects an error event and provides an error processing module 120 with error event messages 112. Those skilled in the art will recognize that the nature and significance of the error events are not the subject matter of this invention. Such messages, however, may include well-known events as access timeouts, acknowledgement failures, hardware failures, etc. The error processing module 120 performs control functions for processing the error event messages 112. Each error event message 112 includes an identifiers. The error processing module 120 consults the error event in an error table 130 according to the identifier in the error event 112. The error processing module 120 further processes the error event message 112 to generate a list of errors as will be described in more detail with reference to FIG. 2 below.

Figure 2:
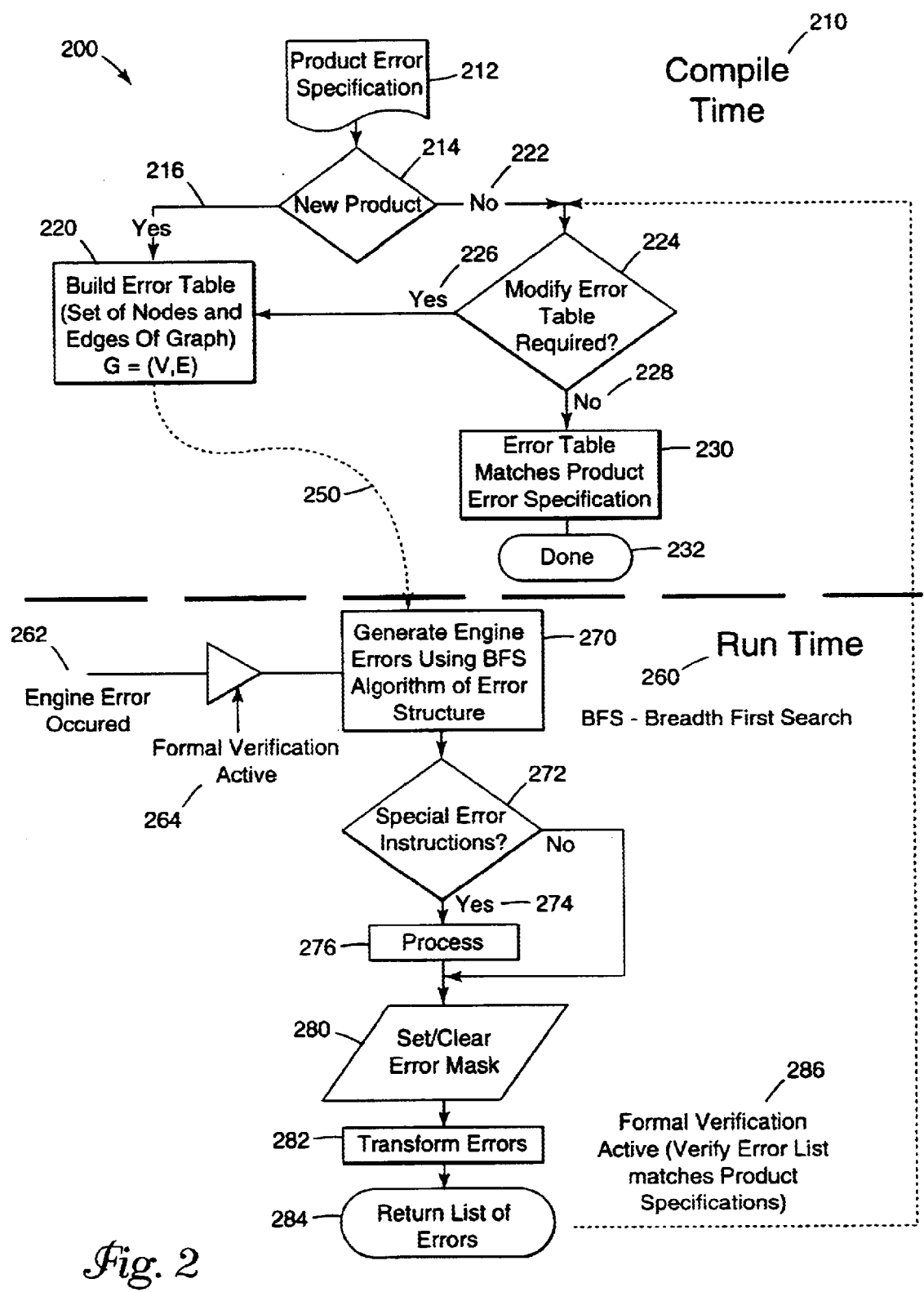
FIG. 2 illustrates an efficient method for generating and implementing engine error codes and verifying the correctness of the implementation of the engine error codes according to the present invention.

FIG. 2 illustrates an efficient method 200 for generating and implementing engine error codes and verifying the correctness of the implementation of the engine error codes according to the present invention. FIG. 2 illustrates two aspects of the present invention: the compile time portion 210 and the run time portion 260. Engines within a product line have similar error structures. Thus, an error processing method 200 may be developed that can easily be adapted to different products. The run time portion 260 is designed to be easily adapted to products with a similar error structure. Links to information imbedded in the error structure is accessible via an error table, which may differ from product to product. Accordingly, for a new product, only the error table must be developed or modified as described with reference to the compile time portion 210.

Referring to FIG. 2, a product error specification is provided 212. Then, a decision is made whether the product error specification is for a new product 214. If a new product is involved 216, a new error table is built 220. If a new product is not involved 222, a decision is made whether the error table needs to be modified 224. If the error table requires modification 226, a modified error table is built 220. If the error table is not to be modified 228, then the error table is determined to match the product error specification 230 and the compile time portion 210 is terminated 232.

As can be seen in FIG. 2, the error tables generated in the compile portion 210 are used 250 in the run time portion 260. First, an engine error occurs 262. A selection may be made to verify that the error table matches the product error specification 264 as described above. From a verified error table, the engine errors are generated preferably using a breadth first search algorithm 270. However, those skilled in the art will recognize that the present invention is not meant to be limited to the particular search algorithm. For example, those skilled in the art will recognize that a depth first search or a combination thereof could be used without departing from the present invention.

Next, the instructions are examined to determined whether there are special error instructions 272. If there are special error instructions 274, they are processed 276. A error mask is then set or cleared 280. Next, all errors are transformed 282 and a list of errors is returned 284. As described above, when the formal verification selection is active, the process may return to the compile time portion 210 to determine whether a modification is necessary to the error table 286.

Figure 3:
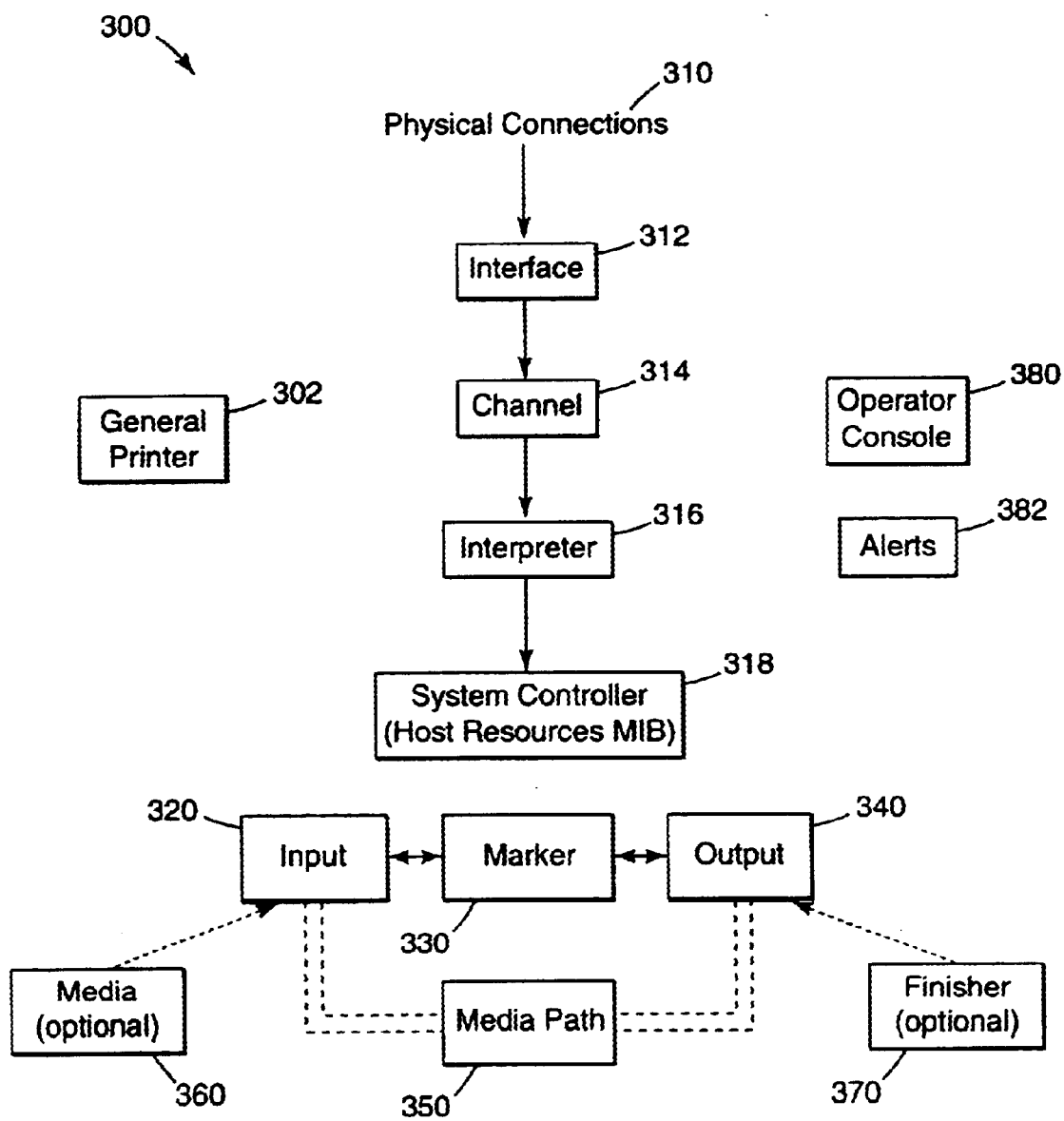
FIG. 3 illustrates a block diagram of a printer, wherein the system controller includes a system for processing error events according to the present inverntion.

Those skilled in the art will recognize that the present invention may be implemented in any type of device that processes error codes. For example, a printer may implement the efficient method for generating and implementing-engine error codes and verifying the correctness of the implementation of the engine error codes. FIG. 3 illustrates the three basic functions of a printer: (1) the flow of a print file into an interpreter and onto the marker, (2) the flow of media through the marker and (3) the auxiliary sub-units that control and facilitate the two prior flows. As shown in FIG. 3, the flow of the print data comes through a physical connection 310 on which some form of transport protocol stack is running to a printer interface 312. The data provided by the transport protocol (interface) appears on a channel 314. The channel 314 provides the data stream to the input to an interpreter 316. The interpreter 316 is responsible for the conversion of a description of intended print instances into images that are to be marked on the media. A printer may have one or more interpreters.

As shown in FIG. 3, the media 360 initially resides in Input sub-units 320 from which the media 360 is selected and then transported via a Media Path 350 first to a Marker 330 and then onto an Output 340 with (optionally) some finishing operations 370 being performed. The Input 320 is a mechanism that feeds media to be marked on into the printer. There may be as many Inputs 330 as there are distinctly selectable input "addresses". The Media 320 is an extension of the Input 320 which represents that media that is in an Input 320. The Output 340 is a mechanism that receives media that has been marked on. A printer may contain one or more Output mechanisms 340. There are as many Outputs 340 as there are distinctly selectable output "addresses". A finisher 370 is a unit that performs some operations on the media other than marking. Some examples of finishing processes are stapling, punching, binding, inserting, or folding.

A Marker 330 is the mechanism that produces marks on the print media. A printer can contain one or more Markers 330. Some examples of multiple marker sub-units 330 are: a printer with separate markers for normal and magnetic ink or an image setter that can output to both a proofing device and final film. Each Marker 330 can have its own set of characteristics associated with it, such as marking technology and resolution. The media paths 350 encompass the mechanisms in the printer that move the media through the printer and connect all other media related units: Inputs 320, Outputs 340, Markers 330 and Finishers 370. A printer may contain one or more media paths 350. In general, the design of the media paths 350 determines the maximum speed of the printer as well as the maximum media size that the printer can handle. Media paths 350 are complex mechanisms and can contain many different identifiable sub-mechanisms such as media movement devices, media buffers, duplex units and interlocks. Not all of the various sub-mechanisms reside on every media path 350. For example, one media path may provide printing only on one surface of the media (a simplex path) and another media path may have a sub-mechanism that turns the media over and feeds it a second time through the marker sub-unit (a duplex path). The duplex path may even have a buffer sub-mechanism that multiple copies of the obverse side to be held before the reverse side of all the copies are marked.

The auxiliary sub-units, such as the General Printer 302, Operator Console 380 and Alerts 382, facilitate control of the printer, inquiry/control of the operator panel, reporting of alerts, and the adaptation of the printer to various natural languages and characters sets. The General Printer 302 is responsible for the overall control and status of the printer. The Operator Console 380 is used to display and modify the state of the printer. For example, the console 380 may be used to display error codes for the printer. The console 380 can be as simple as a few indicators and switches or as complicated as full screen displays and keyboards. The Alert unit 382 is responsible for detecting reportable events, making an entry in the alert table and, if and only if the event is a critical event, initiating a trap.

All of the above described functions run on the System Controller 318 which represents the processor, memory and storage systems of the printer. The System Controller 318 implements the control functions and error message processing for the printer. Accordingly, the System Controller 318 may provide a system for processing error events as described with reference to FIG. 1. Furthermore, the System Controller 318 may be configured to perform the efficient method for generating and implementing engine error codes and verifying the correctness of the implementation of the engine error codes according to the present invention. The System Controller 318 also includes the MIB, which provides the specification of the processor(s), memory, disk storage, file system and other underlying sub-mechanisms of the printer. The System Controller 318 can range from simple single processor systems to multiprocessor systems. In addition, controllers can have a full range of resources such as hard disks. Those skilled in the art will recognize that a printer may have more than one processor and multiple other resources associated with it.

Referring again to FIGS. 1–3, the process illustrated with reference to FIG. 2 may be tangibly embodied in a computer-readable medium or carrier, e.g. one or more of the fixed and/or removable data storage devices 170, or other data storage or data communications devices. The computer program 172 of the storage device 170 may be loaded into the random access memory 174 of the error processing module 130 to configure the error processing module 120, which may be implemented in the System Controller 318 of FIG. 3, for execution. The computer program 172 comprise instructions which, when read and executed by the System Controller 318 of FIG. 3, causes the System Controller 318 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for efficiently generating engine error codes, comprising:
   providing an error table specifically tailored for a first engine and providing links to information stored in an error structure of the first engine; and
   generating a list of errors according to the error table using a general run time generator, wherein the error table is generated according to a product error specification.

2. The method of claim 1, further comprising:
   updating the product error specification; and
   updating the error table to match the product error specification.

3. The method of claim 1 further comprises:
   receiving an error code from a first engine;
   generating engine errors based upon a structure provided by the error table;
   processing the generated engine errors using error masking;
   transforming the errors; and
   returning a list of errors.

4. The method of claim 3 further comprising, prior to processing the generated engine errors using error masking, determining whether the generated engine errors comprise special error instructions and processing the special instructions when the generated engine errors comprise special error instructions.

5. The method of claim 3 wherein the processing the generated engine errors using error masking further comprises setting an error mask.

6. The method of claim 3 wherein the processing the generated engine errors using error masking further comprises clearing an error mask.

7. The method of claim 3 wherein the generating engine errors based upon a structure provided by the error table comprises using a breadth first search.

8. The method of claim 3 wherein the generating engine errors based upon a structure provided by the error table comprises using a depth first search.

9. The method of claim 3 wherein the generating engine errors based upon a structure provided by the error table comprises using a combination of breadth and depth searching.

10. A system for processing errors, comprising:
    an engine for providing an error event;
    an error table describing error states and providing links to information stored in an error structure of the engine for use in generating error codes based upon the error event; and
    an error processor, coupled to the engine and the error table, the error processor including a general run time error generator for generating a list of errors according to the error table, wherein the error table is generated according to a product error specification.

11. The system of claim 10, wherein the error processor receives an error code from a first engine, generates engine errors based upon a structure provided by the error table, processes the generated engine errors using error masking, transforms die errors and returns a list of errors.

12. The system of claim 11 wherein the error processor, prior to processing the generated engine errors using error masking, determines whether the generated engine errors comprise special error instructions and processes the special instructions when the generated engine errors comprise special error instructions.

13. The system of claim 11 wherein the error processor processes the generated engine errors using error masking further comprises setting an error mask.

14. The system of claim 11 wherein the error processor processes the generated engine errors using error masking further comprises clearing an error mask.

15. The system of claim 11 wherein the error processor generates engine errors based upon a structure provided by the error table using a breadth first search.

16. The system of claim 11 wherein the error processor generates engine errors based upon a structure provided by the error table comprises using a depth first search.

17. The system of claim 11 wherein the error processor generates engine errors based upon a structure provided by the error table comprises using a combination of breadth and depth searching.

18. A printer, comprising:
    a channel for receiving a data stream from a physical connection running a transport protocol stack;
    an interpreter, coupled to the channel, for converting a description of intended print instances in the data screen into images that are to be marked on print media;
    an input, output and a marker, the input providing the media to a marker for producing marks on the print media according to the images, the marker providing the printed media to the output; and
    a system controller for implementing control functions for processing the images from the interpreter to the marker, the system controller further comprising a system for processing errors, the system for processing errors comprising:

an engine for providing an error event;

an error table describing error states and providing links to information stored in an error structure of the engine for use in generating error codes based upon the error event; and an error processor, coupled to the engine and the error table, the error processor including a general run time error generator for generating a list of errors according to the error table.

19. The printer of claim 18 wherein the error table is generated according to a product error specification.

20. The printer of claim 19 wherein the error processor receives an error code from a first engine, generates engine errors based upon a structure provided by the error table, processes the generated engine errors using error masking, transforms the errors and returns a list of errors.

21. The printer of claim 20 wherein the error processor, prior to processing the generated engine errors using error masking, determines whether the generated engine errors comprise special error instructions and processes the special instructions when the generated engine errors comprise special error instructions.

22. The printer of claim 20 wherein the error processor processes the generated engine errors using error masking further comprises setting an error mask.

23. The printer of claim 20 wherein the error processor processes the generated engine errors using error masking further comprises clearing an error mask.

24. The printer of claim 20 wherein the error processor generates engine errors based upon a structure provided by the error table using a breadth first search.

25. The printer of claim 20 wherein the error processor generates engine errors based upon a structure provided by the error table comprises using a depth first search.

26. The printer of claim 20 wherein the error processor generates engine errors based upon a structure provided by the error table comprises using a combination of breadth and depth searching.

27. An article of manufacture comprising a program storage medium readable by a computer, the medium tangibly embodying one or more programs of instructions executable by the computer to perform a method for efficiently generating and implementing engine error codes and verifying the correctness of the implementation of the engine error codes, the method comprising:

providing an error table generated according to a product error specification and specifically tailored for a first engine;

providing links to information stored in an error structure of the first engine; and generating a list of errors according to the error table using a general run time generator.

28. The article of manufacture of claim 27 further comprising:

updating the product error specification; and updating the error table to match the product error specification.

* * * * *